(12) United States Patent
Rebbert et al.

(10) Patent No.: US 11,703,813 B2
(45) Date of Patent: Jul. 18, 2023

(54) TRACKING A POSITION OF A MOTORIZED WINDOW TREATMENT

(71) Applicant: Lutron Technology Company LLC, Coopersburg, PA (US)

(72) Inventors: Thomas F. Rebbert, Hellertown, PA (US); Robert J. Thompson, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/846,549

(22) Filed: Jun. 22, 2022

(65) Prior Publication Data
US 2022/0326662 A1    Oct. 13, 2022

Related U.S. Application Data

(63) Continuation of application No. 16/526,091, filed on Jul. 30, 2019, now Pat. No. 11,409,248.
(Continued)

(51) Int. Cl.
*G05B 23/02* (2006.01)
*G05B 11/01* (2006.01)
(Continued)

(52) U.S. Cl.
CPC ...... *G05B 11/01* (2013.01); *E06B 2009/2423* (2013.01); *E06B 2009/6845* (2013.01);
(Continued)

(58) Field of Classification Search
CPC ..................................................... G05B 11/01
(Continued)

(56) References Cited

U.S. PATENT DOCUMENTS 6,100,659 A    8/2000  Will et al.
6,497,267 B1  12/2002  Azar et al.
(Continued)

FOREIGN PATENT DOCUMENTS

EP         2063336 A2    5/2009
WO      2009079685 A1    7/2009

OTHER PUBLICATIONS

International Preliminary Report on Patentability and Written Opinion, in corresponding International Patent Application No. PCT/US2019/044110, dated Feb. 11, 2021.
Office Action dated Apr. 1, 2022 in corresponding Canadian patent application No. 3, 108, 018, 3 pages.

*Primary Examiner* — Erick D Glass
(74) *Attorney, Agent, or Firm* — Duane Morris LLP

(57) ABSTRACT

Motorized window treatment systems are disclosed. A motorized window treatment system may include a covering material, a sensor circuit, and a control circuit. The sensor circuit may be configured to generate sensor signals indicative of a position of the covering material. The control circuit may be configured to determine a present sensor state of the sensor circuit, determine a predicted sensor state for the sensor circuit based at least in part on a power-down position recorded at a first time and a final position recorded at a second time, compare the predicted sensor state with the present sensor state, and determine a present position of the covering material based on the comparison of the predicted sensor state and the present sensor state. Methods of adjusting a position of a covering material of a motorized window treatment also are disclosed.

23 Claims, 10 Drawing Sheets

Related U.S. Application Data

(60) Provisional application No. 62/711,923, filed on Jul. 30, 2018.

(51) Int. Cl.
    *E06B 9/68*         (2006.01)
    *E06B 9/24*         (2006.01)

(52) U.S. Cl.
    CPC ............... *G05B 2219/2653* (2013.01); *G05B 2219/45015* (2013.01)

(58) Field of Classification Search
    USPC ........................................................ 318/565
    See application file for complete search history.

(56) References Cited

U.S. PATENT DOCUMENTS

| | | |
|---|---|---|
| 7,281,565 B2 | 10/2007 | Carmen, Jr. et al. |
| 7,737,653 B2 | 6/2010 | Carmen, Jr. et al. |
| 7,839,109 B2 | 11/2010 | Carmen, Jr. et al. |
| 2003/0000653 A1* | 1/2003 | Ulatowski ............... E06B 9/361 160/84.02 |
| 2003/0168186 A1* | 9/2003 | Wen ........................ E06B 9/322 160/168.1 P |
| 2007/0209764 A1* | 9/2007 | Arnhold ................. A62C 2/247 160/7 |
| 2014/0262058 A1* | 9/2014 | Mullet ..................... E06B 9/42 160/7 |

\* cited by examiner

|  | 2 bytes | 2 bytes |
|---|---|---|
| m | Position | Memory Counter |
| 1 | 8000 | 0041 |
| 2 | 8001 | 0042 |
| 3 | 8002 | 0043 |
| 4 | 8004 | 0044 |
| 5 | 8005 | 0045 |
| 6 | 8006 | 0046 |
| →7 | 8522 | 0027 |
| 8 | 8523 | 0028 |

TRACKING A POSITION OF A MOTORIZED WINDOW TREATMENT

CROSS-REFERENCE TO RELATED APPLICATIONS

This application is a continuation of U.S. patent application Ser. No. 16/526,091, which was filed Jul. 30, 2019 claiming the benefit of U.S. Provisional Patent Application No. 62/711,923, filed Jul. 30, 2018, the entire disclosures of which are hereby incorporated by reference.

BACKGROUND

Motorized window treatments, such as motorized roller shades, may include a covering material (e.g., a shade fabric) and a motor drive unit for controlling a motor that adjusts a position of the covering material (e.g., a position of a bottom edge of the covering material). The motor drive unit may monitor a present position of the covering material, for example using sensors. The motor drive unit may use the present position of the covering material to control the operation of the shade or covering material.

For example, the covering material may have certain limits set for safety and aesthetic reasons. Those limits may correspond to a fully-open position and/or a fully-closed position relative to the coverage area, e.g., a window. The motor drive unit may use the present position to adjust covering material to a desired position (e.g., the fully-open position, the fully-closed position, or an intermediate position between the fully-open position and the fully-closed position). The motor drive unit may also use the present position to a make sure that the covering material does not move beyond prescribed limits (e.g., the fully-closed position or the fully-opened position). More generally, the motor drive unit is used to accurately achieve desired coverage. In addition, the present position may also be used to ensure that the edges of associated covering materials are aligned for aesthetics. Having the window treatment operate outside desired limits or in an undesired manner may impact the reliability of the motor or drive circuitry and may lead to a decrease in customer satisfaction.

SUMMARY

As disclosed herein, a motorized window treatment system may include one or more sensors coupled to a motor to generate sensor states indicative of a position of a movable component. Some conditions of operation may cause the determined present position of the moveable component to shift in one direction or the other. For example, a critical event, such as a power loss event, may result in inaccurate sensor state detection, which may in turn result in inaccurate determination of the present position. Such inaccuracies may be caused by hysteresis in the generation of the states (e.g., a high state versus a low state) of the signals produced by circuitry used to sense magnetic fields associated with rotations of the motor (e.g., a Hall-Effect sensor circuit). Further, if the motor is rotating during the power loss event (e.g., while one or more internal supply voltages are decreasing from nominal magnitudes towards zero volts), the problem may be further exacerbated. Thus, when the motorized window treatment system is powered up again after the critical event, the control circuit may no longer have an accurate position of the movable component or motor. In this regard, the present disclosure provides for example systems and methods for correcting such inaccuracies due to critical events.

More specifically, a loss of power to a motor drive unit of the motorized window treatment system may cause inaccuracies in the present position determined by the motor drive unit. A loss of power may be caused by a utility power outage, a local power outage (e.g., in response to cycling of a circuit breaker), or a motor stall (which may be caused if the covering material becomes stuck on a nearby object while the motor is rotating). When the motor drive unit is powered up again after the power loss event, the present sensor states detected may not be consistent with the sensor states detected during the power loss (even if the motor did not move). This means that the last position stored in the motorized window treatment system that was determined based on the sensor states detected during the power loss may not accurately reflect the present position of the motor and thus the covering material upon power-up (even if the motor did not move). Further, the problem may be exacerbated if the motor continued to rotate during the power loss event.

Such position inaccuracies, even if slight, impact the normal operation of the motorized window treatment system. For example, in the case of a power loss event where the motor was not rotating (and thus the covering material was not moving), the sensor states of the magnetic sensor recorded prior to or during the power loss event and the sensor states once power is restored may not match up, indicating a possible small difference (e.g., less than one rotation) between the recorded and present positions. During install or repair, where the motorized window treatment system power may be cycled multiple times, the potential additive effect of small inaccuracies in the system may subsequently have more significant operational and aesthetic impact on the motorized window treatment system.

Such impact may include, for example, the motor drive unit moving the covering material beyond the limits set for aesthetic reasons, or moving the covering material to an inaccurate position. For example, moving the covering material too far up may cause the covering material to be caught in the roller tube, which may result in damage to the covering material and/or the motor drive unit. As another example, moving the covering material too far down may cause excess covering material to collect on the floor, which may be unpleasant. In yet another example, the covering material may not be able to reach a fully-open or a fully-closed position. The aesthetic problem is exacerbated for a motorized window treatment having multiple covering materials controlled by multiple motor drive units, since the drifts in the sensor states may be different for the multiple motor drive units, which may make it impossible to align the multiple covering materials. Further, the problem may be exacerbated over time, since multiple power loss events may cause the drift to accumulate over time.

As disclosed herein, a motorized window treatment system may comprise a covering material, a motor drive circuit configured to generate signals that cause a motor to change a position of the covering material, a sensor circuit configured to generate one or more sensor signals (e.g., two sensor signals) indicative of the position of the covering material, and a control circuit coupled to sensor circuitry to receive the one or more sensor signals. The control circuit may, at power-up, determine a present sensor state for each of two sensor signals, determine a predicted sensor state for each of the sensor signals, compare the predicted sensor state with the present sensor state for each of the sensor signals, and determine the present position of the covering material based on the comparison of the predicted sensor state and the present sensor state of each of the sensor signals.

The control circuit may also cause storage in a memory of a first position value of the covering material and one or more power-down sensor values based on a supply voltage of the treatment system being equal to or less than a threshold value, and wherein the control circuit is further configured to calculate a second position value based on the first position value and the one or more power-down sensor values stored in the memory and to cause storage in the memory of the second position value as a system position reset. The supply voltage may be one of a voltage supplied by an external power source to the system or by an internal power source of the system. The control circuit may calculate the second position based on the first position value, the one or more power-down sensor values, and a final position value. The control circuit may calculate the second position based on the first position value, the one or more power-down sensor values, a final position value, and one or more final sensor values. The control circuit may calculate the second position based on an adjustment factor, the adjustment factor is determined based on a comparison of the one or more final sensor values and one or more present sensor values.

In aspects of the technology disclosed herein, the control circuit of the motorized window treatment system may be configured to detect a power loss or impending power loss event based on a supply voltage falling below a predetermined low-voltage threshold. Upon detection of the power loss event, the control circuit may store a present position as the power-down position and one or more present sensor states as the power-down sensor states. The low-voltage threshold may be set such that the motorized window treatment system may make an early detection of the power loss event, but without being overly sensitive to noise. Further, because the power-down position and the power-down sensor states were recorded before the supply voltage dropped to an even more undesirably low level (e.g., when the control circuit is no longer able to calculate positions based on sensor states), the control circuit may use the power-down position and the power-down sensor states to determine an accurate present position of the movable component after power is restored and the motorized window treatment system is again operational.

Upon power-up, the control circuit may determine the final position from the memory during the power loss event. By comparing the final position to the power-down position, the control circuit may determine whether the motor had continued to move or rotate after the power-down position was stored. If the motor was not moving during the power loss event (e.g., the power-down position matches the final position stored in the motorized window treatment system), power-up sensor states (e.g., the present sensor states at power-up) may be expected to be equal to the power-down sensor states. If the power-up sensor states detected at power-up match these power-down sensor states, the control circuit may conclude that the power-down sensor states detected are accurate, therefore the power-down position determined based on these power-down sensor states are also accurate. The control circuit may then set the present position as the power-down position.

If, however, the power-up sensor states detected at power-up do not match these power-down sensor states, further corrections or an error log may be made. For example, if the power-up sensor states do not match these power-down sensor states, an adjustment factor may be determined based on a comparison of the power-down sensor states and the power-up sensor states. The control circuit may then set the power-up position at power-up based on the power-down position and the adjustment factor. The adjustment factor may comprise change in position based on a comparison between the power-down sensor states and the power-up sensor. In cases where an adjustment factor cannot be determined, the control circuit may log an error.

If the motor had continued moving after the power-down position was stored (e.g., the power-down position does not match the final position stored in the motorized window treatment system), the control circuit may determine that further calculations are needed. For example, the control circuit may calculate predicted final sensor states for the final position based on the power-down position, the final position, and the power-down sensor states. The control circuit may then determine the power-up sensor states, and compare them to the predicted final sensor states to determine whether the present position may be set as the final position, or if further adjustments need to be made. In this regard, if the predicted final sensor states and the power-up sensor states are the same, the control circuit may conclude that the predicted final sensor states are accurate, therefore the final position must also be accurate. The control circuit may then set the present position at power-up as the final position. If, however, the predicted final sensor states and the power-up sensor states are different, the control circuit may make further corrections or log an error. For example, the corrections may be made based on an adjustment factor as described above, except that the adjustment factor would be determined based on a comparison between the predicted final sensor states (instead of power-down sensor states) and the power-up sensor states, and the present position at power-up may be set based on the final position and the adjustment factor.

The present disclosure further provides a method for adjusting a present position of a covering material of a motorized window treatment. The method may comprise: determining, at power-up, a present sensor state for each of two sensors; determining a predicted sensor state for each of the sensors; comparing the predicted sensor state with the present sensor state for each of the sensors; and determining the present position of the covering material based on the comparison of the predicted sensor state and the present sensor state of each of the sensors.

The present disclosure further provides a method for detecting a power-down event based on a voltage falling below a predetermined threshold low voltage, storing a position based on detection of the power-down event as the power-down position, and storing a sensor state based on detection of the power-down event as the power-down position for each of one or more sensors. The method may further comprise determining a final position stored in the memory during the power-down event, and determining a predicted final sensor state for each of the one or more sensors for the final position based on the power-down position, the final position, and the one or more power-down sensor states.

The method may further comprise comparing the final position with the power-down position, and determine whether a motor was rotating during a power loss event (e.g., while an internal supply voltage is decreasing from a nominal magnitude towards zero volts). If it was determined that the motor was rotating during the power loss event, the predicted final sensor state for each of the one or more sensors is determined based on a number of sensor edges and the one or more power-down sensor states. If it was determined that the motor was stopped before and during the power loss event, the predicted final sensor state is set as the power-down sensor state for each of the one or more sensors.

The method may further comprise determining, at power-up after the power-down event, a present sensor state for each of the one or more sensors, and comparing the predicted final sensor state with the present sensor state for each of the one or more sensors when the predicted final position is different from the power-down position. If the predicted final sensor state is different from the present power-up sensor state for at least one of the one or more sensors, it is determined that an inaccuracy exists at power-up.

The method may further comprise determining that the predicted final sensor state and the present power-up sensor state are not different for all of the one or more sensors, determining an adjustment factor based on a difference between the predicted final sensor state and the present sensor state for at least one of the one or more sensors, and setting a present position based on the final position and the adjustment factor. The method may further comprise determining that the predicted final sensor state and the present power-up sensor state are different for each of the one or more sensors, logging an error, and setting a present power-up position as the final position. The method may further comprise determining that no error occurred at power-up when the predicted final sensor state is same as the present power-up sensor state for each of the one or more sensors, and setting a present power-up position as the final position.

The technology described herein is advantageous in a number of ways. For example, the technology provides for an early detection of critical events. With this early detection, the technology is equipped to store data points that can still be trusted, and use these trusted data points to determine an accurate position upon power-up. The technology is efficient because it does not require storing all the sensor signals throughout a critical event, which may require both an increased memory size and an increased processing power. Further, if all the sensor signals throughout a critical event are stored, it may be difficult to determine which of these sensor signals can be trusted, and which cannot be trusted. In summary, by accurately reconstructing the present position of the movable component after critical events, the technology may avoid moving the component beyond limits set for aesthetic reasons, or moving the component to an inaccurate position.

BRIEF DESCRIPTION OF THE DRAWINGS

FIG. 4 illustrates example positions stored in a memory of a motor drive unit of a motorized window treatment system.

DETAILED DESCRIPTION

Figure 1:
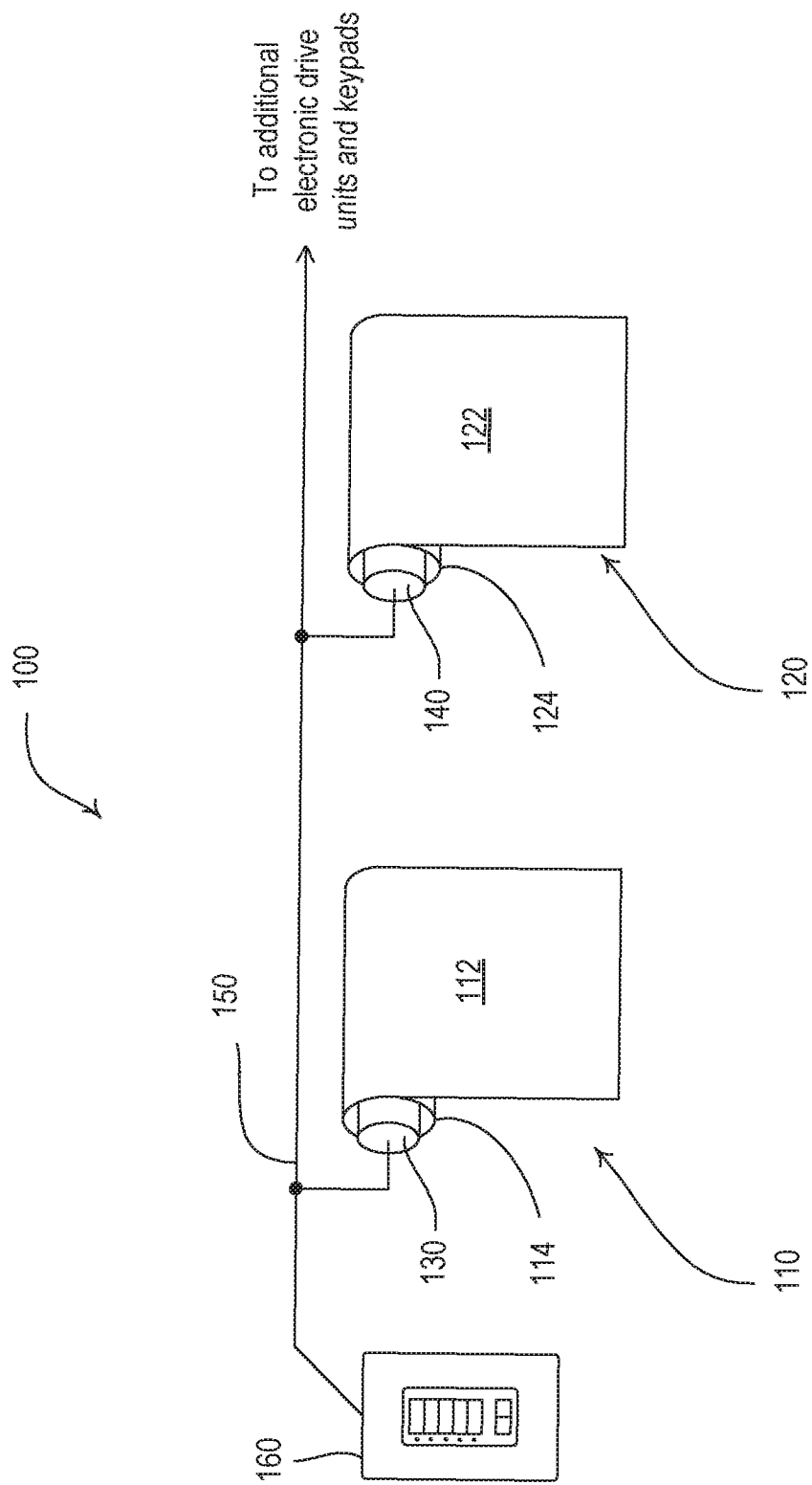
FIG. 1 illustrates an example of a motorized window treatment system.

FIG. 1 is a simplified block diagram illustrating an example window treatment system 100 according to aspects of the disclosure. The window treatment system 100 may include one or more window shades, such as window shades 110, 120. The window shades 110, 120 may each include a covering material, e.g., a shade fabric, such as shade fabrics 112, 122. The shade fabrics 112, 122 may each be supported by a roller tube, such as roller tubes 114 and 124. The shade fabrics 112, 122 may be each made of a flexible material that may be rolled onto or off the respective roller tube 114, 124 to raise and lower the shade fabric. One or more movements of the shade fabrics 112, 122, respectively. For example, the motor drive units 130 and 140 may be configured to move the shade fabrics 112 and 122 between a fully-open position $P_{FULLY-OPEN}$ and a fully-closed position $P_{FULLY-CLOSED}$, for example, with respect to a window. In this example, the motor drive units 130 and 140 are positioned inside the roller tubes 114, 124.

The motor drive units 130 and 140 may be coupled to a communication link 150 and may communicate (e.g., transmit and/or receive) signals across the communication link 150. The communication link 150 may be any type of wired or wireless communication link, such as a radio-frequency communication link or an infrared communication link. For example, the motor drive units 130 and 140 may send signals to and/or receive signals from each other (e.g., and any other motor drive units and control devices that are not shown) via the communication link 150. This way, the various motor drive units of the window treatment system 100 may control the various window shades in a coordinated fashion, such as making sure that the shades all align at the bottom.

In another example, the motor drive units 130 and 140 may send signals to and/or receive signals from one or more user interfaces, such as a user interface device 160, via the communication link 150. For example, the user interface device 160 may be a keypad (as shown), a touch screen, or a voice user interface. A user may enter commands via the user interface device 160, for example, such as "fully open shade," "fully close shade," "open shade 40%," "close shade by 20 cm," "open both shade 110 and shade 120," "open shade 110 and close shade 120," etc. The user interface device 160 may also include one or more displays that provide feedback to the user. For example, the display may be a screen showing a status of the user's command, a status of the window shades 110 and 120, or prompts for further user commands. The user interface device 160 may include one or more visual indicators that may be illuminated by light-emitting diodes (LEDs) to indicate a status of the window shades 110 and 120.

While only two window shades 110, 120 (e.g., with two shade fabrics 112, 122, two roller tubes 114, 124, and two motor drive units 130, 140), and one user interface 160 are shown in the window treatment system 100 of FIG. 1, any number of window shades, shade fabrics, roller tubes, motor drive units, and user interfaces may be included in the window treatment system 100. Further, while each of the window shades 110, 120 is shown having separate roller tubes 114 and 124 and separate motor drive units 120, 130, it should be understood that in other examples two or more roller tubes may be driven by a single motor drive unit.

Figure 2:
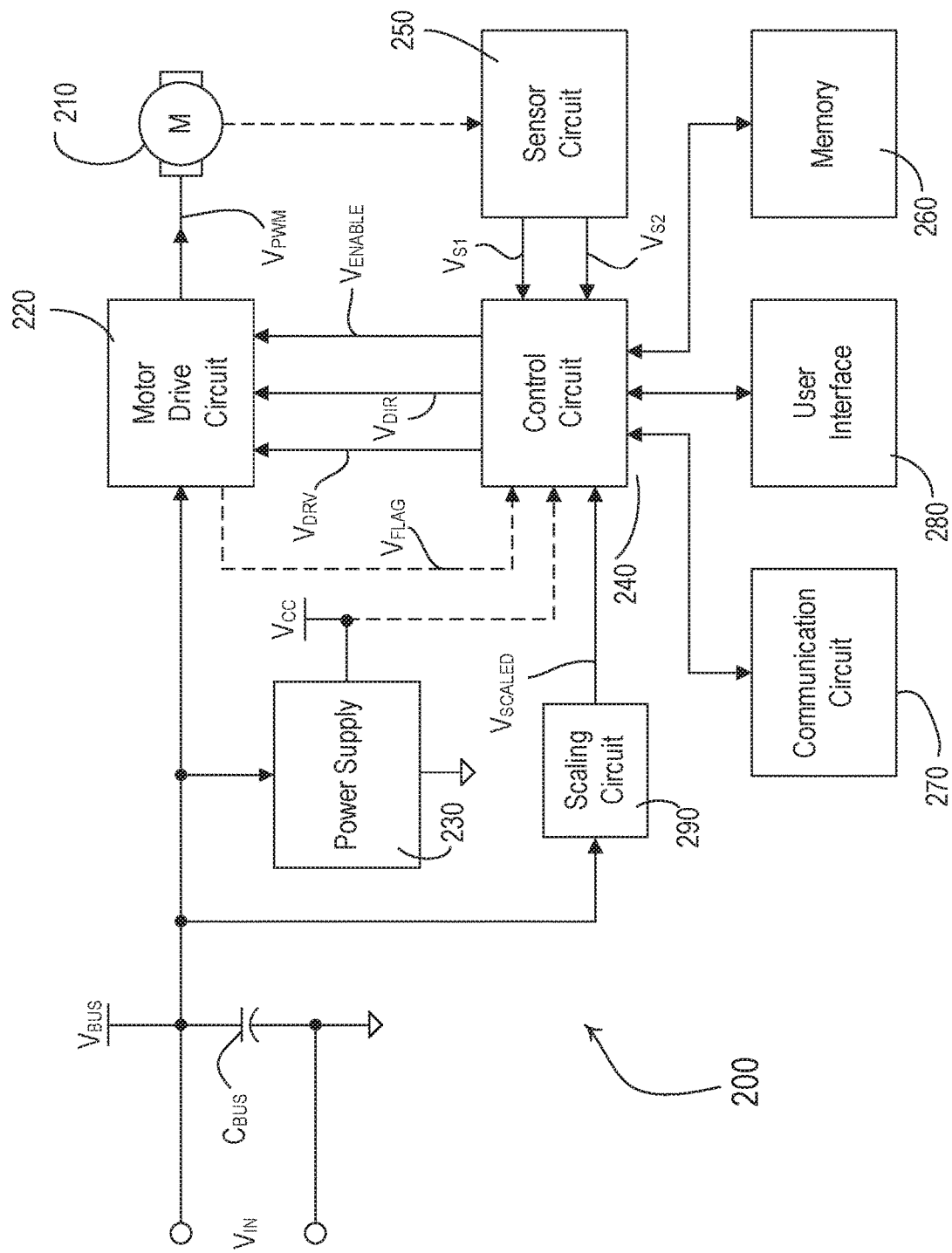
FIG. 2 is a block diagram illustrating an example motor drive unit of a motorized window treatment system.

FIG. 2 is a simplified block diagram illustrating an example motor drive unit 200 according to aspects of the disclosure. The motor drive unit 200 may be implemented in any system for moving one or more components in a controlled manner. For example, the motor drive unit 200 may be implemented as the motor drive unit 130 shown in FIG. 1 to move the shade fabric 112. The motor drive unit 200 may include a motor 210 for moving one or more components (e.g., rotating the roller tube to move the shade fabric 112 shown in FIG. 1). For example, the motor 210 may be coupled to the roller tube 114 for controlling rotation of the roller tube 114. The motor 210 may be any type of motor, such as a direct-current (DC) motor, an alternating-current (AC) motor, a permanent magnet motor, a brushless motor, a stepper motor, etc.

The motor drive unit 200 may include a motor drive circuit 220 for driving the motor 210. The motor drive circuit 220 may be any type of drive circuit, such as an H-bridge drive circuit. The motor drive circuit 220 may generate signals for driving the motor 210. For example, the motor drive circuit 220 may generate a pulse-width modulated (PWM) signal $V_{PWM}$, which may have a duty cycle and may be provided to the motor 210. Adjustment of the magnitude of the duty cycle of the PWM signal $V_{PWM}$ applied to the motor 210 may change the rotational speed of the motor 210, and adjustment of a polarity of the PWM signal $V_{PWM}$ applied to the motor 210 may change the direction of rotation of the motor 210.

The motor drive unit 200 may receive an input voltage VIN from an external power supply (not shown). The external power supply may be any type of power supply, such as an alternating-current (AC) power supply, a direct-current (DC) power supply, a battery, a photovoltaic power source (e.g., such as a solar cell), etc. The motor drive unit may comprise a bus capacitor $C_{BUS}$ across which a bus voltage $V_{BUS}$ may be produced. The motor drive unit 200 may further include a rectifier circuit (not shown) and/or a power converter circuit (not shown) for receiving the input voltage VIN and generating the bus voltage $V_{BUS}$ across the bus capacitor $C_{BUS}$. The bus voltage $V_{BUS}$ may be supplied to the motor drive circuit 220 for generating signals that drive the motor 210. The bus voltage $V_{BUS}$ may also be supplied to a power supply 230, which may generate a supply voltage $V_{CC}$ to power the circuitry of the motor drive unit 200.

The motor drive unit 200 may further include a control circuit 240 for controlling the motor drive circuit 220, which in turn drives the motor 210. The control circuit 240 may be configured to generate various control signals for controlling the motor drive circuit 220. For example, the control signals may include a drive signal $V_{DRV}$ that causes the motor drive circuit 220 to control the rotational speed of the motor 210. For instance, the drive signal $V_{DRV}$ may be a PWM signal, where rotational speed of the motor 210 is dependent upon a duty cycle of the PWM signal. As another example, the control signals may include a direction signal $V_{DIR}$ that causes the motor drive circuit 220 to control the direction of rotation of the motor 210. In another example, the control signals may include an enable signal VENABLE for enabling and/or disabling the motor drive circuit 220, which in turn enables and/or disables the motor 210. The control circuit 240 may include one or more processors. The one or more processors may be any conventional processors, such as a commercially available CPU. Alternatively, the one or more processors may be dedicated components such as an application specific integrated circuit (ASIC), a microprocessor, a programmable logic device (PLD), a microcontroller, a field-programmable gate array (FPGA), or any suitable processing device or control circuit.

The motor drive unit 200 may include a sensor circuit 250. The sensor circuit 250 may include one or more sensors that generate sensor signals $V_{S1}$, $V_{S2}$ in response to the movements (e.g., rotations) of the motor 210. The one or more sensors may be any type of magnetic sensor, such as a Hall effect sensor, MEMS sensors, magneto-diode, etc. For example, the sensor circuit 250 may include one Hall effect sensor that generates a sensor signal, where the sensor signal may include various sensor states. For instance, each change in the sensor state may indicate that a rotational position of the motor 210 has changed by a certain amount. For another example, the sensor circuit 250 may include two or more Hall effect sensors that each generate a sensor signal including various sensor states. For instance, a change in the state of any of the sensor signals $V_{S1}$, $V_{S2}$ generated by the sensors may indicate that the rotational position of the motor 210 has changed by a certain amount, and the states of the sensors signals $V_{S1}$, $V_{S2}$ for the various sensors may collectively indicate the direction of rotation of the motor 210. The sensor circuit 250 may use hysteresis when generating the sensor signals $V_{S1}$, $V_{S2}$ and determining the state of each sensor signal (e.g., a low state or a high state) as will be described in greater detail below with reference to FIG. 3B.

Figure 3A:
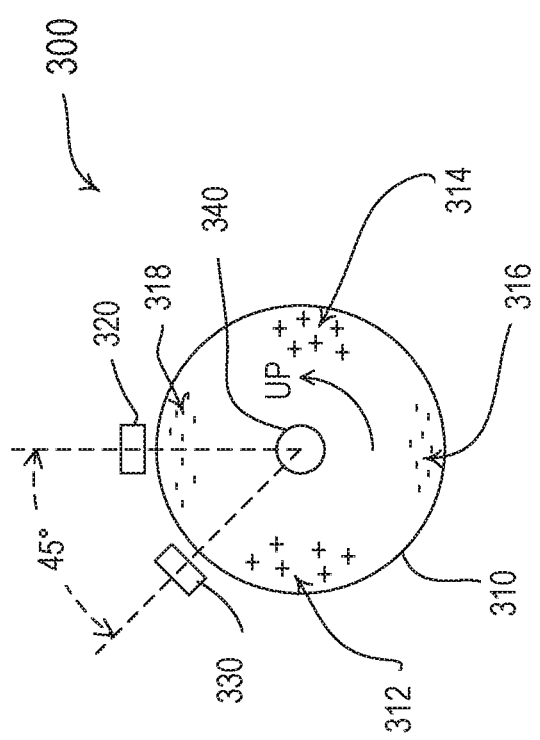
FIGS. 3A and 3B illustrate an example of a sensor system of a motor drive unit of a motorized window treatment system.

FIG. 3A is a pictorial diagram illustrating an example sensor system 300 according to aspects of the disclosure. The sensor system 300 may be implemented in any motor drive unit for moving one or more components. For example, the sensor system 300 may be implemented as part of the sensor circuit 250 of the motor drive unit 200 shown in FIG. 2. The sensor system 300 may be implemented to monitor movements of the one or more components driven by the motor drive unit 200. For example, the sensor system 300 may be implemented to monitor rotations of a motor (e.g., the motor 210) to track the position of the shade fabric 112 shown in FIG. 1, as well as the direction of rotation of the motor 210 (e.g., whether the shade fabric 112 is being rolled upwards or downwards).

The sensor system 300 may include a magnet 310, which may be secured onto the motor, for example onto a shaft 340 of the motor 210, such that the magnet 310 rotates with the shaft 340 as the motor 210 rotates. For example, a counter-clockwise rotation (as shown) may correspond to a direction of rotation of the motor 210 that drives the shade fabric 112 in an upwards direction (opening the shade), and a clockwise rotation may correspond to a direction of rotation of the motor 210 that drives the shade fabric 112 in a downwards direction (closing the shade). The magnet 310 may be any type of magnet, such as a circular magnet having alternating north pole (e.g., positive pole) and south pole (e.g., negative pole) regions. The magnet 310 may have any number of positive poles and corresponding negative poles. For example, the magnet 310 may have two positive poles 312, 314 and two negative poles 316, 318 as shown in FIG. 3A.

The sensor system 300 may include two sensors: a first sensor 320 and a second sensor 330. The first and second sensors 320, 330 may be positioned along a periphery of the magnet 310 and separated from each other by an angle, for example, by 45 degrees as shown. The first and second sensors 320, 330 may be magnetic sensors (e.g., Hall effect sensors) that may detect changes in magnetic flux density of magnetic fields produced by the magnet 310 as the magnet 310 rotates with the shaft 340 of the motor 210. For example, each of the first and second sensors 320, 330 may detect the two positive poles 312, 314 and the two negative poles 316, 318 as the magnet 310 completes a full rotation. Alternatively, the first and second sensor 320, 330 may be located adjacent to each other, but may be oriented to detect magnetic fields that are 45 degrees apart from each other. In addition, the first and second sensor 320, 330 may be positioned and/or oriented to detect magnetic fields that are a difference amount apart from each other, such as, for example, 90 degrees apart from each other.

Figure 3B:
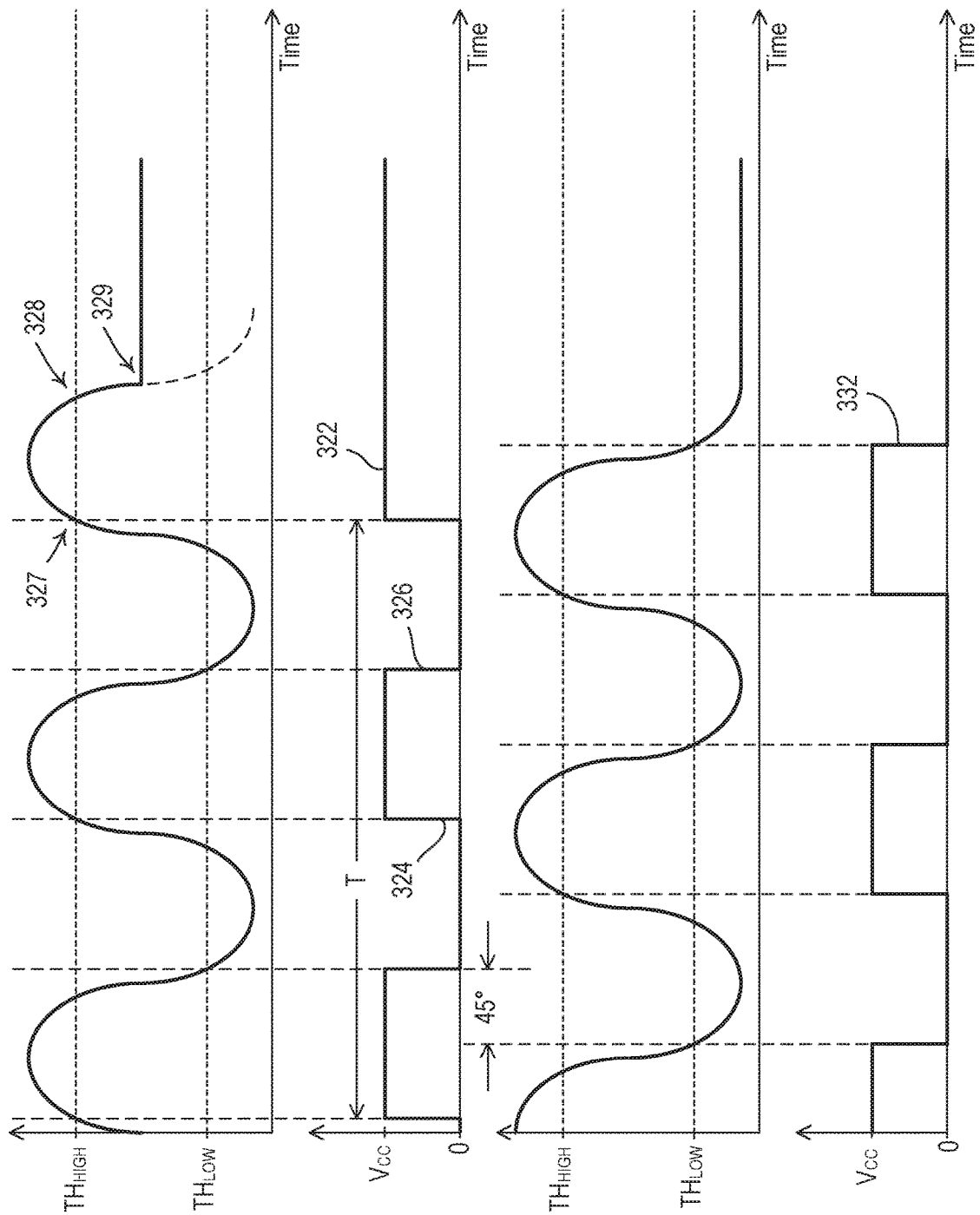

FIG. 3B shows example sensor signals produced by the sensor system 300. The first and second sensors 320, 330 are configured to generate first and second sensor signals 322, 332, respectively, for example using hysteresis. The first and second sensors 320, 330 may each drive the respective sensor signal 322, 332 high towards the supply voltage $V_{CC}$ to generate a high state (such as a logic 1) when the magnitude of a respective magnetic flux density $B_1$, $B_2$ at the respective sensor rises above a high magnetic field threshold $TH_{high}$. The first and second sensors 320, 330 may each drive the respective sensor signal 322, 332 low towards circuit common to generate a low state (such as a logic 0) when the magnitude of the respective magnetic flux density $B_1$, $B_2$ drops below a low magnetic field threshold $TH_{low}$. For example, as the magnet 310 rotates such that one of the positive poles 312, 314 is close to the first sensor 320, the first sensor signal 322 may transition from the low state to the high state, thereby creating a rising edge 324 in the first sensor signal 322. Likewise, as the magnet 310 rotates such that one of the negative poles 316, 318 is close to the first sensor 320, the first sensor signal 322 may transition from the high state to the low state, thereby creating a falling edge 326 in the first sensor signal 322. Thus, during a full rotation of the magnet 310 (e.g., during a period T shown in FIG. 3B), each of the first and sensor signals 322, 332 may have four sensor edges (e.g., two rising edges and two falling edges).

The relative spacing between the first and second sensor signals 322, 332 may indicate the direction of rotation of the motor 210. For example, when the motor 210 is rotating in a counterclockwise direction of the shaft 340, the second sensor signal 332 may lag behind the first sensor signal 322 by approximately 45 degrees (e.g., as shown in FIG. 3B). For another example, when the motor 210 is rotating in a clockwise direction of the shaft 340, the second sensor signal 332 may lead the first sensor signal 322 by approximately 45 degrees. The period T of the first and sensor signals 322, 332 may be a function of the rotational speed of the motor 210. The first and second sensor signals 322, 332 may be sent as trains of pulses to the control circuit 240, for example for analyses.

Although FIGS. 3A and 3B show the example sensor system 300 having two sensors 320, 330 and the magnet 310 with two positive poles 312, 314, and two negative poles 316, 318, any number of sensors may be included with a magnet having any number of north-south pole pairs. In that regard, each sensor would generate a number of sensor edges equal to the number of poles of the magnet 310 during one full rotation of the magnet 310. In examples where the sensor system 300 includes multiple sensors, the sensors may be spaced such that their relative spacings indicate the rotation direction of the magnet. In examples where the sensor system 300 includes only one sensor, the sensor signal itself would not indicate the direction of rotation of the magnet 310, but may be determined otherwise, for example from the direction signal $V_{DIR}$ of the control circuit 240 or the PWM signal $V_{PWM}$ of the motor drive circuit 220.

Referring back to FIG. 2, the control circuit 240 may be configured to determine the rotational position and/or the direction of rotation of the motor 210 based on the sensor signals $V_{S1}$, $V_{S2}$ generated by the sensor circuit 250. For example, the control circuit 240 may determine that, based on the sensor signals $V_{S1}$, $V_{S2}$, the motor 210 has rotated a certain amount in a particular direction. Based on the rotational position and direction of rotation of the motor 210, the control circuit 240 may be further configured to determine a present position $P_{PRES}$ of the one or more compo-nents configured to be moved by the motor 210. For example, if the motor drive unit 200 is implemented in the window treatment system 100 in FIG. 1, the control circuit 240 may be configured to determine, based on the sensor signals $V_{S1}$, $V_{S2}$ indicating that the motor 210 has rotated a certain amount in a particular rotational direction, that the shade fabric 112 has moved a certain distance in a particular linear direction. The control circuit 240 may be configured to update the present position $P_{PRES}$ of shade fabric in response to detecting edges of the sensor signals $V_{S1}$, $V_{S2}$ (e.g., the present position $P_{PRES}$ may be characterized by a number of sensor edges).

The values for the fully-open position $P_{FULLY-OPEN}$ and the fully-closed position $P_{FULLY-CLOSED}$ may be set equal to the present position $P_{PRES}$ when the shade fabric is at the desired fully-open and fully-closed limits, respectively. For instance, the values for the fully-open position $P_{FULLY-OPEN}$ and the fully-closed position $P_{FULLY-CLOSED}$ may be set or reset during setup and configuration of the motor drive unit 200 and/or the window treatment system 100. The difference between the values for the fully-open position $P_{FULLY-OPEN}$ and the fully-closed position $P_{FULLY-CLOSED}$ may be approximately equal to the number of edges of the sensor signals $V_{S1}$, $V_{S2}$ between the fully-open position $P_{FULLY-OPEN}$ and the fully-closed position $P_{FULLY-CLOSED}$.

The control circuit 240 may be configured to receive the sensor signals $V_{S1}$, $V_{S2}$ from the sensor circuit 250 and periodically update the present position $P_{PRES}$ of the fabric 112. For example, the control circuit 240 may increment or decrement the present position $P_{PRES}$ each time that the control circuit 240 detects a change in one or more sensor states (e.g., rising or falling sensor edge). For another example, the control circuit 240 may increment or decrement the present position $P_{PRES}$ each time the motor 210 completes a full rotation.

The control circuit 240 may be configured to save data to a memory 260 of the motor drive unit 200. For example, if the motor drive unit 200 is implemented in the window treatment system 100 in FIG. 1, the control circuit 240 may be configured to store the present position $P_{PRES}$ of the shade fabric 112 to the memory 260. The control circuit 240 may periodically update the present position $P_{PRES}$ of the shade fabric 112 stored in the memory 260 by overwriting the previous present position in a memory location, or by storing the present position in different memory locations. The control circuit 240 may be further configured to store the sensor states to the memory 260. To save memory space and time required to store data in the memory 260, the control circuit 240 may be configured not to save sensor states to the memory 260, but only the present positions determined based on the sensor signals. The control circuit 240 may further be configured to store to the memory 260 various threshold values, such as a low-voltage threshold value indicating a power loss event, the fully-open position value of the shade fabric 112, and predetermined fully-closed position value of the shade fabric 112. One example position table implemented in the memory 260 is described in detail below with respect to FIG. 4.

FIG. 4 is a pictorial diagram illustrating an example position table 400 in a memory of a motorized window treatment. The position table 400 may be implemented in any motor drive unit for moving a component. For example, the position table 400 may be implemented as part of the memory 260 of the motor drive unit 200 shown in FIG. 2. The position table 400 may be implemented to store positions of the one or more components driven by the motor drive unit 200. For example, the position table 400 may be implemented to store positions of the shade fabric 112 shown in FIG. 1.

Each row of the table 400 in this example may represent a memory location. For example, as shown in FIG. 4, position value 8000 is stored in memory location 1, position value 8001 is stored in memory location 2, and position value 8522 is stored in memory location 7, etc. Each time a position value is stored in the position table 400, a memory counter may be incremented and stored along with the corresponding position value in the same memory location. In this example, each memory location may store four bytes of data, where the position values are each two bytes of data, and the memory counter is two bytes of data.

As shown, the position table 400 may be configured such that the position values that are sequential in time are stored in sequential memory locations. For example, position values 8000, 8001, 8002, 8004, 8005, and 8006 are sequential in time (as indicated by the corresponding memory counters) and are stored at sequential memory locations 1-6, respectively. In this regard, a discontinuity in the memory counter may indicate that the position values are not sequential even if the position values are stored in neighboring memory locations. For example, although position value 8006 is stored in memory location 6 and position value 8522 is stored at memory location 7, their respective memory counters, 46 and 27, indicate that the two position values are not sequential.

The memory 260 may store information accessible by the one or more processors or control circuit, including instructions that may be executed by the one or more processors. The memory 260 may also include data that may be retrieved, manipulated or stored by the one or more processors. The memory 260 may be of any non-transitory type capable of storing information accessible by the one or more processors, such as a hard-drive, memory card, ROM, RAM, DVD, CD-ROM, flash memory device, write-capable, and read-only memories.

The instructions may be any set of instructions to be executed directly, such as machine code, or indirectly, such as scripts, by the one or more processors. In that regard, the terms "instructions," "application," "steps," and "programs" may be used interchangeably herein. The instructions may be stored in object code format for direct processing by a processor, or in any other computing device language including scripts or collections of independent source code modules that are interpreted on demand or compiled in advance. Functions, methods, and routines of the instructions are explained in more detail below. For example, the instructions may include instructions for the motor drive circuit 220, the control circuit 240, and/or the sensor circuit 250, such as those shown in FIGS. 6 and 7.

Data may be retrieved, stored or modified by the one or more processors in accordance with the instructions. For instance, although the subject matter described herein is not limited by any particular data structure, the data may be stored in computer registers, a table having many different fields and records, etc. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories, or information that is used by a function to calculate the relevant data. For example, the data may include signals received from or sent to the motor drive circuit 220, the control circuit 240, and/or the sensor circuit 250, such as those shown in FIGS. 3A-3B or the position information depicted via FIG. 4.

If the motor drive unit 200 experiences a critical event, such as a loss of power, the present position $P_{PRES}$ determined by the control circuit 240 may become inaccurate. The inaccuracy in the present position $P_{PRES}$ may result from the hysteresis operation used by the sensor circuit 250 to generate the states of the sensor signals $V_{S1}$, $V_{S2}$. For example, a first one of sensors of the sensor circuit 250 (e.g., the first sensor 320) may drive the first sensor signal $V_{S1}$ into the high state when the magnetic flux density $B_1$ of the magnetic field at the first sensor 320 rises above the high threshold $TH_{HIGH}$ (e.g., as shown at 327 in FIG. 3B). The first sensor 320 may continue to drive the first sensor signal $V_{S1}$ in the high state when the magnetic flux density $B_1$ of the magnetic field at the first sensor 320 has dropped into the region between the high threshold $TH_{HIGH}$ and the low threshold $TH_{LOW}$ (e.g., as shown at 328 in FIG. 3B). The first sensor 320 may not drive the first sensor signal $V_{S1}$ into the low state until the magnetic flux density $B_1$ of the magnetic field at the first sensor has dropped below the low threshold $TH_{LOW}$. If the motor 210 stops rotating before the magnetic flux density $B_1$ of the magnetic field at the first sensor 320 drops below the low threshold $TH_{LOW}$, the first sensor 320 may maintain the magnitude of the first sensor signal $V_{S1}$ in the high state (e.g., as shown at 329 in FIG. 3B).

When the power is reapplied to the motor drive unit 200 after a power loss, the first sensor 320 may measure the magnetic flux density $B_1$ of the magnetic field to determine the state of the first sensor signal $V_{S1}$. Upon receiving power, the first sensor 320 may be configured to compare the magnetic flux density $B_1$ of the magnetic field to the high threshold $TH_{HIGH}$. If the motor drive unit 200 loses power when the magnitude of the magnetic flux density $B_1$ of the magnetic field is between the high threshold $TH_{HIGH}$ and the low threshold $TH_{LOW}$, the state determined by the first sensor 320 may be different than the state determined before power was lost. For example, if the magnitude of the magnetic flux density $B_1$ of the magnetic field is between the high threshold $TH_{HIGH}$ and the low threshold $TH_{LOW}$, the first sensor 320 may determine that the state of the first sensor signal $V_{S1}$ should be low even though the magnitude of the magnetic flux density $B_1$ of the magnetic field never dropped below the low threshold $TH_{LOW}$ before power was lost (e.g., since the magnetic flux density $B_1$ is less than the high threshold $TH_{HIGH}$ when the first sensor 320 is repowered).

In addition, if the motor 110 is rotating when power is lost, the inaccuracy in the present position $P_{PRES}$ may be worsened due to possible continued rotation of the motor 210 after the present position $P_{PRES}$ was last stored in the memory 260. The inconsistent generation of the states of the first sensor signals $V_{S1}$, $V_{S2}$ may cause the present position $P_{PRES}$ of the shade fabric 112 as determined by the control circuit 240 to drift over time.

Referring back to FIG. 2, the control circuit 240 may be configured to detect critical events, such as a power loss event. In this regard, the control circuit 240 may be responsive to the magnitude of either the supply voltage $V_{CC}$ of the power supply 230 and/or the bus voltage $V_{BUS}$ across the bus capacitor $C_{BUS}$, such that, when the magnitude of the bus voltage $V_{BUS}$ and/or the supply voltage $V_{CC}$ drops below a low-voltage threshold, the control circuit 240 may determine and/or detect that a power loss event is occurring or is about to occur. For example, the motor drive unit 200 may comprise a scaling circuit 290, such as one or more voltage dividers, for generating a scaled voltage $V_{SCALED}$ that may indicate the magnitude of the bus voltage $V_{BUS}$ and may be received by the control circuit 240, e.g., via an analog-to-digital converter (ADC). The control circuit 240 may also directly receive the supply voltage $V_{CC}$ via the analog-to-digital converter (e.g., as shown as dashed arrow). Alternatively or additionally, the motor drive circuit 220 may be configured to send a flag signal $V_{FLAG}$ (e.g., as shown as dashed arrow) to the control circuit 240 when the magnitude of the bus voltage $V_{BUS}$ drops below the low-voltage threshold.

The low-voltage threshold may be set as a percentage of the bus voltage $V_{BUS}$ and/or supply voltage $V_{CC}$ during normal operation such that the control circuit 240 may be able to make an early detection of the power loss event but is not overly sensitive. Such early detection may be advantageous since allow the control circuit 240 may initiate a power-down sequence to store useful data and/or to prevent damage. For example, the low-voltage threshold may be set at 80% of the bus voltage $V_{BUS}$ and/or the input voltage $V_{CC}$. In addition, since the bus voltage $V_{BUS}$ may be larger in absolute value and may be noisy, a value of the low-voltage threshold based on the magnitude of the bus voltage $V_{BUS}$ may be set lower, down to 60% for example, of the bus voltage $V_{BUS}$. Since the supply voltage $V_{CC}$ is generated by the internal power supply 230, a value of the low-voltage threshold based on the magnitude of the supply voltage $V_{CC}$ may need to be set within a tighter range since that voltage is not expected to vary much from the operational value or not as noisy. The control circuit 240 may use one or both of the bus voltage $V_{BUS}$ and the supply voltage $V_{CC}$ for detecting a power down condition. For example, if the magnitudes of both the bus voltage $V_{BUS}$ and the supply voltage $V_{CC}$ are at or below their respective thresholds, the control circuit 240 may determine a potential or actual power down event.

Figure 5A:
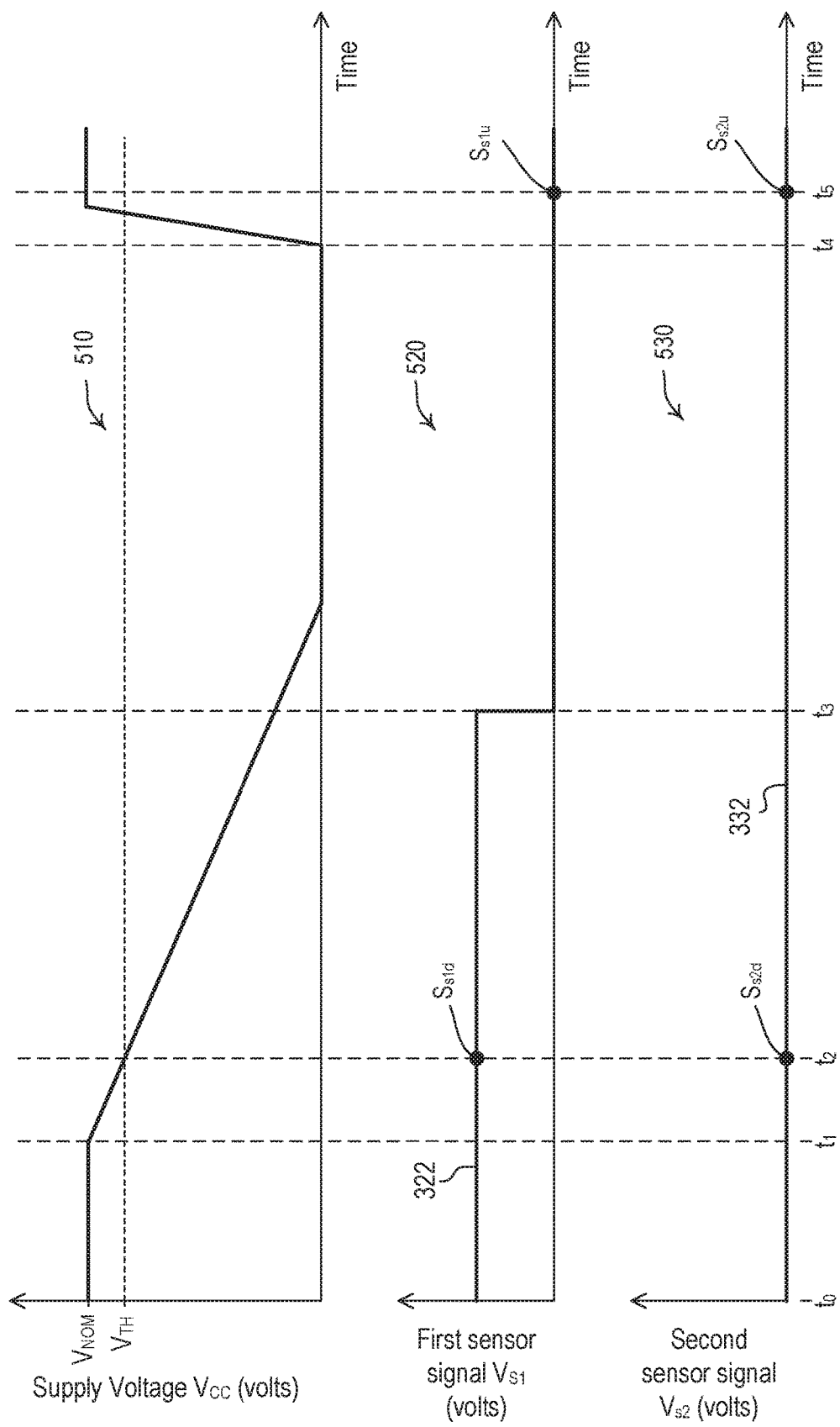
FIGS. 5A and 5B illustrate example sensor signals that may be generated by a sensor system of a motor drive unit of a motorized window treatment system.
Figure 5B:
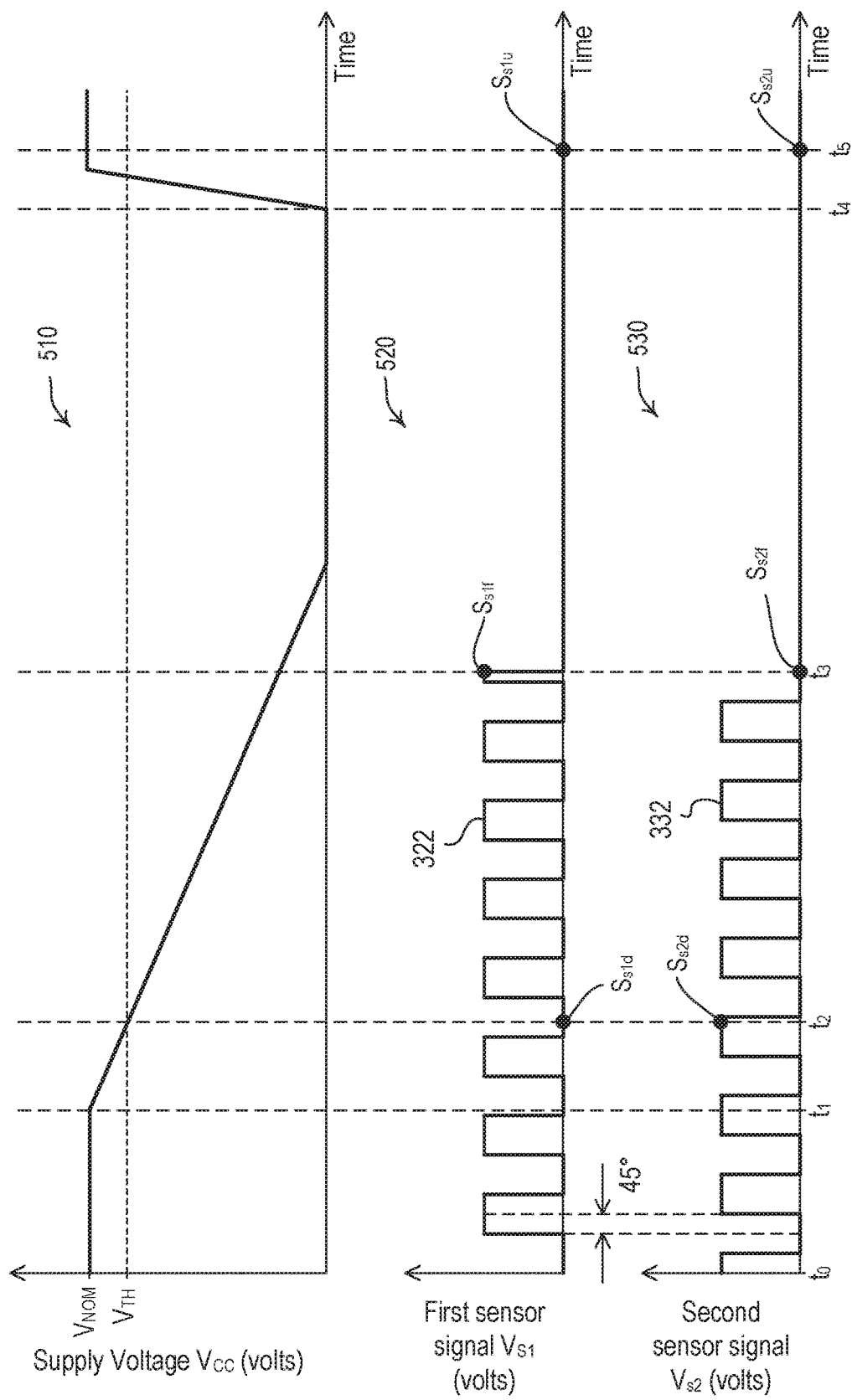

FIGS. 5A and 5B are pictorial diagrams 500A and 500B illustrating example signals during a power loss event according to aspects of the disclosure. Specifically, the diagrams 500A and 500B show example signals generated by the motor drive unit 200 (FIG. 2) that implements the sensor system 300 (FIGS. 3A and 3B) for controlling movements of the shade fabric 112 (FIG. 1), and stores the positions of the shade fabric 112 in the position table 400 (FIG. 4). In this regard, in both FIGS. 5A and 5B, graph 510 is a plot of the supply voltage $V_{CC}$ of the motor drive unit 200 over time, graph 520 is a plot of the first sensor signal $V_{S1}$ for the sensor 320 over time, and graph 530 is a plot of the second sensor signal $V_{S2}$ for the sensor 330 over time. FIGS. 5A and 5B differ in that, while FIG. 5A shows example signals where the motor 210 is stopped (e.g., not rotating) when the power loss event occurs, FIG. 5B shows example signals where the motor is rotating when the power loss event occurs.

Referring to FIG. 5A, initially at time t0, the supply voltage $V_{CC}$ has a normal magnitude $V_{NOM}$. Since the motor is stopped, the sensor signals 322, 332 generated by the respective sensors 320, 330 are constant DC signals. At time $t_1$, the motor drive unit 200 may lose power and the supply voltage $V_{CC}$ may start to drop below the normal magnitude $V_{NOM}$. At time $t_2$, the supply voltage $V_{CC}$ may drop below the low-voltage threshold $V_{TH}$, and the control circuit 240 may determine that a power loss event is detected. Upon detecting the power loss event, the control circuit 240 may be configured to initiate a power-down procedure. For example, the control circuit 240 may be configured to initiate the example power-down procedure shown in FIG. 6.

For instance, the control circuit 240 may be configured to store additional data to the memory 260 when a power loss event is detected. For instance, the control circuit 240 may be configured to store in the memory 260 the present position of the shade fabric 112 at time $t_2$ as a power-down position $P_d$ when the power loss event is detected. For example, a present position of 8523 may be stored in the memory 260 as the power-down position $P_d$. Further, upon detecting the power loss event at $t_2$, the control circuit 240 may also be configured to store to the memory 260 the sensor states generated by the sensor circuit 250 at time $t_2$ as power-down sensor states $S_{s1d}$, $S_{s2d}$. For example as shown in FIG. 5A, present sensor states of 1 for sensor 320 and 0 for sensor 330 may be stored in the memory 260 as the power-down sensor states $S_{s1d}$, $S_{s2d}$. To distinguish the power-down position $P_d$ from the present position $P_{PRES}$ stored during normal operation, the power-down position $P_d$, as well as the power-down sensor states $S_{s1d}$, $S_{s2d}$, may be stored in specifically designated memory locations of the memory 260 separate from the position table 400, stored locally in the control circuit 240, or stored in the position table 400 with specially-designated memory counter values (e.g., 0000). At time $t_3$, the magnitude of the supply voltage $V_{CC}$ may drop to a level at which the control circuit 240 and the sensor circuit 250 may become unpowered. When the motor last stopped moving (e.g., prior to becoming unpowered at time $t_3$), the control circuit 240 may have stored a final position $P_f$ in the position table 400.

At time $t_4$, the motor drive unit 200 may be powered once again after the power loss event. When the motor drive unit 200 is powered up, the sensors 320, 330 of the sensor circuit 250 may begin to generate the sensor signals 322, 332 at time $t_5$. After time $t_5$, the control circuit 240 may sample the sensor signals 322, 332, and determine power-up sensor states $S_{s1u}$, $S_{s2u}$ (e.g., present sensor states). However, because the power-up sensor states $S_{s1u}$, $S_{s2u}$ detected at power-up may not match the power-down sensor states $S_{s1d}$, $S_{s2d}$ recorded during the power loss event (e.g., even when there had not been any movement during the power loss event), the control circuit 240 may need to make adjustments for certain inaccuracies. The control circuit 240 may use the power-down sensor states $S_{s1d}$, $S_{s2d}$ detected at power-up previously saved in the memory 260 and the power-up sensor states $S_{s1u}$, $S_{s2u}$ to determine whether there is any inconsistency in sensor states. Based on this determination, the control circuit 240 may then determine a present position $P_u$ at power-up using the power-down position $P_d$ previously saved in the memory 260.

In this regard, the control circuit 240 may be configured to compare the power-up sensor states $S_{s1u}$, $S_{s2u}$ detected at time $t_5$ with the power-down sensor states $S_{s1d}$, $S_{s2d}$ stored at time $t_2$. If, at time $t_5$, the control circuit 240 determines that the power-up sensor states $S_{s1u}$, $S_{s2u}$ are not equal to the power-down sensor states $S_{s1d}$, $S_{s2d}$ stored at time $t_2$, the control circuit 240 may conclude that the power-up sensor states $S_{s1u}$, $S_{s2u}$ are inaccurate, and therefore the power-down position $P_d$ previously saved in the memory 260 is also inaccurate. The control circuit may then determine the present position $P_u$ by adjusting the power-down position $P_d$ with an adjustment factor.

For instance, if either the first power-down sensor state $S_{s1d}$ is not equal to the first power-up sensor state $S_{s1u}$ or the second power-down sensor state $S_{s2d}$ is not equal to the second power-up sensor state $S_{s2u}$, an adjustment factor may be determined based on the difference in the power-down sensor states $S_{s1d}$, $S_{s2d}$ and the power-up sensor states $S_{s1u}$, $S_{s2u}$. The present position $P_u$ at power-up may then be determined based on the power-down position $P_d$ and the adjustment factor. For example, as shown in FIG. 5A, at time $t_2$, the control circuit 240 may store the power-down sensor states $S_{s1d}$, $S_{s2d}$ as 1 and 0, respectively and the power-down position $P_d$ as 8523, but may determine both of the power-up sensor states $S_{s1u}$, $S_{s2u}$ as 0. Based on the direction of rotation before power-down, the control circuit 240 may determine that the power-up sensor states $S_{s1u}$, $S_{s2u}$ are 1 sensor edge behind power-down sensor states $S_{s1d}$, $S_{s2d}$, and set the adjustment factor as −1. The control circuit 240 may then adjust the power-down position $P_d$ (e.g., 8523) by the adjustment factor (e.g., −1) to set the present position $P_u$ at power-up (e.g., 8523−1=8522).

If, however, both the first power-down sensor state $S_{s1d}$ is not equal to the first power-up sensor state $S_{s1u}$ and the second power-down sensor state $S_{s2d}$ is not equal to the second power-up sensor state $S_{s2u}$, the control circuit 240 may not be able to reliably determine whether the power-up sensor states $S_{s1u}$, $S_{s2u}$ are behind or ahead of the power-down sensor states $S_{s1d}$, $S_{s2d}$. In such cases, the control circuit 240 may be configured to set the present position at power-up $P_u$ equal to the power-down position $P_d$ stored in the position table 400 in the memory 260. For example, suppose the power-down sensor states $S_{s1d}$, $S_{s2d}$ are 1 and 0, respectively, but the power-up sensor states $S_{s1u}$, $S_{s2u}$ are 0 and 1, respectively, the control circuit 240 may not be able to determine whether the discrepancy is because the power-up sensor states $S_{s1u}$, $S_{s2u}$ are 2 sensor edges behind power-down sensor states $S_{s1d}$, $S_{s2d}$, or 2 sensor edges ahead of power-down sensor states $S_{s1d}$, $S_{s2d}$. In such a case, the control circuit 240 may be further configured to log an error.

Finally, if both of the power-up sensor states $S_{s1u}$, $S_{s2u}$ are equal to the power-down sensor states $S_{s1d}$, $S_{s2d}$, the control circuit 240 set the present position $P_u$ at power-up equal to the power-down position $P_d$ stored in the position table 400 in the memory 260. If the power-down sensor states $S_{s1d}$, $S_{s2d}$ stored at time $t_2$ are 0 and 1, respectively, and the power-up sensor states $S_{s1u}$, $S_{s2u}$ are also 0 and 1, respectively, the control circuit 240 may set the present position $P_u$ at power-up equal to the power-down position $P_d$ (e.g., 8523) as stored in the position table 400 in the memory 260.

FIG. 5B illustrates example signals if the motor 210 continued moving after the power-down position $P_d$ was recorded. When the motor 210 is rotating, the sensor 320, 330 generate the sensor signals 322, 332, which are used by the control circuit 240 to determine present positions of the shade fabric 112. As shown, the first sensor signal 322 leads the second sensor signal 332 by 45 degrees, indicating that the motor 210 is rotating in a first direction (e.g., a counterclockwise direction to move the shade fabric 112 upwards). At time $t_1$, the motor drive unit 200 may lose power and the supply voltage $V_{CC}$ may start to drop below the normal magnitude of $V_{NOM}$. At time $t_2$, the supply voltage $V_{CC}$ may drop below a low-voltage threshold $V_{TH}$, and the control circuit 240 may determine that a power loss event is detected. Upon detecting the power loss event, the control circuit 240 may be configured to initiate a power-down procedure. For example, the control circuit 240 may be configured to initiate the example power-down procedure shown in FIG. 6.

After time $t_2$, the magnitude of the supply voltage $V_{CC}$ may continue to drop while the motor 210 may continue to rotate and the sensors 320 and 330 may continue to generate sensor signals 322, 332 in response to the movement. The control circuit 240 may continue to update the present position of the shade fabric 112 in the position table 400 until time $t_3$, when the magnitude of the supply voltage $V_{CC}$ may drop to a level at which the control circuit 240 and the sensor circuit 250 may become unpowered. Prior to becoming unpowered at time $t_3$, the control circuit 240 may have stored a final position $P_f$ in the position table 400.

At time $t_4$, the motor drive unit 200 may be powered once again after the power loss event. When the motor drive unit 200 is powered up, the sensors 320, 330 of the sensor circuit 250 may begin to generate the sensor signals 322, 332 at time $t_5$. After time $t_5$, the control circuit 240 may sample the sensor signals 322, 332, and determine the power-up sensor states $S_{s1u}$, $S_{s2u}$. However, because the power-up sensor states $S_{s1u}$, $S_{s2u}$ detected at power-up may not match the power-down sensor states $S_{s1d}$, $S_{s2d}$ recorded during the power loss event, the control circuit 240 may need to make adjustments for certain inaccuracies. In addition, the continued movement of the motor after time $t_2$ may introduce additional inaccuracies as to the actual present position of the shade fabric. The control circuit 240 may use the data previously saved in the memory 260 (e.g., the power-down sensor states $S_{s1d}$, $S_{s2d}$, the power-down position $P_d$, and final position $P_f$) as well as the power-up sensor states $S_{s1u}$, $S_{s2u}$, to determine whether the motor continued moving after time $t_2$, and whether there is any inconsistency in the sensor states. Based on these determinations, the control circuit 240 may then determine a present position $P_u$ at power-up.

In this regard, the control circuit 240 may be configured to look up the final position $P_f$ in the position table 400, and compare the final position $P_f$ with the power-down position $P_d$. If the control circuit 240 determines that the final position $P_f$ is equal to the power-down position $P_d$, the control circuit 240 may conclude that the motor 210 was stopped at time $t_2$. For example, referring to FIG. 4, if the final position $P_f$ in the position table 400 is 8523 and the power-down position $P_d$ is also 8523, the control circuit 240 may conclude that the motor 210 was stopped at time $t_2$. Further, based on the determination that the motor 210 was stopped at time $t_2$, the control circuit 240 may be configured to predict that the final sensor states $S_{s1f}$, $S_{s2f}$ at time $t_3$ are the same as the power-down sensor states $S_{s1d}$, $S_{s2d}$.

If the control circuit 240 determines that the final position $P_f$ is not equal to the power-down position $P_d$, the control circuit 240 may conclude that the motor 210 continued to rotate after time $t_2$. For example, referring to FIG. 4, if the final position $P_f$ stored in position table 400 is 8541, but the power-down position $P_d$ is 8523, the control circuit 240 may determine that the motor 210 continued to rotate after the power-down position $P_f$ was recorded at time $t_2$. In this case, the control circuit 240 may be configured to predict that the final sensor states $S_{s1f}$, $S_{s2f}$ by determining the difference between the power-down position $P_d$ and the final position $P_f$. For example, the control circuit 240 may determine that, since the power-down position $P_d$ was 8523, and the final position $P_f$ was 8540, the final position $P_f$ is 18 increments from the power-down position $P_d$. Thus, the control circuit 240 may determine that a total of 18 sensor edges were generated by the two sensors 320 and 330 between times $t_2$ and $t_3$. The control circuit 240 may further look up the direction of the rotation prior to the control circuit 240 and the sensor circuit 250 losing power at time $t_3$ (for example, stored in the memory 260). Using the direction of the rotation at power-down and the 18 total sensor edges, the control circuit 240 may be configured to reproduce the sensor states between times $t_2$ and $t_3$, and predict that the final sensor states $S_{s1f}$, $S_{s2f}$ at time $t_3$ may be 1 and 0, respectively.

Thus, regardless of whether the motor 210 had was stopped or rotating at time $t_2$, the control circuit 240 may predict the final sensor states $S_{s1f}$, $S_{s2f}$ at time $t_3$. The control circuit 240 may be configured to compare the predicted final sensor states $S_{s1f}$, $S_{s2f}$ at time $t_3$ with the power-up sensor states measured at time $t_5$ after power-up. If, as illustrated in FIG. 5B, the control circuit 240 determines that the predicted final sensor states $S_{s1f}$, $S_{s2f}$ at time $t_3$ are not equal to the power-up sensor states $S_{s1u}$, $S_{s2u}$ (e.g., if either the first predicted final sensor state $S_{s1f}$ is not equal to the first power-up sensor state $S_{s1u}$ or the second predicted final sensor state $S_{s2f}$ is not equal to the second power-up sensor state $S_{s2u}$), the control circuit 240 may determine the present position $P_u$ at power-up based on the final position $P_f$ and an adjustment factor. For example, as illustrated in FIG. 5B, if the predicted final sensor states $S_{s1f}$, $S_{s2f}$ at time $t_3$ are 1 and 0, respectively, and the power-up sensor states $S_{s1u}$, $S_{s2u}$ are both 1, the control circuit 240 may determine that the power-up sensor states $S_{s1u}$, $S_{s2u}$ are 1 sensor edge ahead of final sensor states $S_{s1f}$, $S_{s2f}$, and set the adjustment factor as +1. If the final position $P_f$ stored in the position table 400 is 8541, the control circuit 240 may set the present position $P_u$ at power-up to be 8542 (e.g., 8541+1=8542).

If, however, both the first predicted final sensor state $S_{s1f}$ is not equal to the first power-up sensor state $S_{s1u}$ and the second predicted final sensor state $S_{s2f}$ is not equal to the first power-up sensor state $S_{s2u}$, the control circuit 240 may not be able to determine whether the power-sup sensor states $S_{s1u}$, $S_{s2u}$ are behind or ahead of the final sensor states $S_{s1f}$, $S_{s2f}$. In such cases, the control circuit 240 may be configured to set the present position at power-up as the final position $P_f$ stored in the position table 400 in the memory 260. For example, if the final sensor states $S_{s1f}$, $S_{s2f}$ are equal to 1 and 0, respectively, but the power-up sensor states $S_{s1u}$, $S_{s2u}$ are equal to 0 and 1, respectively, the control circuit 240 may not be able to determine whether the discrepancy is because the power-up sensor states $S_{s1u}$, $S_{s2u}$ are 2 increments behind final sensor states $S_{s1f}$, $S_{s2f}$ or 2 increments ahead of final sensor states $S_{s1f}$, $S_{s2f}$. The control circuit 240 may be further configured to log an error.

If the predicted final sensor states $S_{s1f}$, $S_{s2f}$ are equal to the power-up sensor states $S_{s1u}$, $S_{s2u}$, the control circuit 240 may set the present position $P_u$ at power-up equal to the final position $P_f$ stored in the position 400 in the memory 260. Thus, for the example above where the motor 210 continued to rotate 18 edges between times $t_2$ and $t_3$, if the predicted final sensor states $S_{s1f}$, $S_{s2f}$ are 1 and 0, respectively, and the power-up sensor states $S_{s1u}$, $S_{s2u}$ are also 1 and 0, respectively, the control circuit 240 may set the present position $P_u$ at power-up equal to the final position $P_f$ (e.g., 8540) stored in the position table 400 in the memory 260.

Although the foregoing description above with respective to FIGS. 5A and 5B involve two sensors, the control circuit 240 may be configured to make analogous determinations when the sensor system 300 includes more than two sensors. In this regard, the control circuit 240 may be configured to make analogous determinations using more than two power-down sensor states (e.g., $S_{s1d}$, $S_{s2d}$, . . . , $S_{snd}$), the power-down position $P_d$, the final position $P_f$, and the power-up sensor states (e.g., $S_{s1u}$, $S_{s2u}$, $S_{snu}$). One notable difference is that, even if two present sensor states at power-up are different from their corresponding predicted final sensor states, it may still be possible to determine adjustment factors, so long as not all of the power-down sensor states ($S_{s1d}$, $S_{s2d}$, $S_{snd}$) are different from the corresponding power-up sensor states ($S_{s1u}$, $S_{s2u}$, $S_{snu}$). On the other hand, the control circuit 240 may also be configured to make analogous determinations when the sensor system 300 includes only one sensor, however, the control circuit 240 may require additional information to determine the direction of the adjustment factor (e.g., from the direction signal $V_{DIR}$ of the control circuit 240 or the PWM signal of the motor drive circuit 220).

Referring back to FIG. 2, the motor drive unit 200 may further include a communication circuit 270 that allows the control circuit 240 to transmit and receive communication signals, such as wired communication signals and/or wireless communication signals, such as radio-frequency (RF) signals. For example, the communication circuit 270 may be configured to provide the communication link 150 shown in FIG. 1.

The motor drive unit 200 may further include a user interface 280 for allowing a user to provide inputs to the control circuit 240. The user may use the user interface 280 during set up and configuration, and/or during normal operation (e.g., while the motor drive unit 200 is running). The user may send a command using the user interface 280 to the control circuit 240 via the communication circuit 270, and the control circuit 240 may control the motor drive circuit 220, which controls the movement of the motor 210. For example, the user interface 280 may be configured as the user interface 160 shown in FIG. 1.

While only one motor 210, motor drive circuit 220, power supply 230, control circuit 240, memory 250, sensor circuit 260, communication circuit 270, and user interface 280 are shown in the motor drive unit 200, alternatively any number of motors, motor drive circuits, power supplies, control circuits, memories, sensor circuits, communication circuits, and user interfaces may be included in the motor drive unit 200.

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 6:
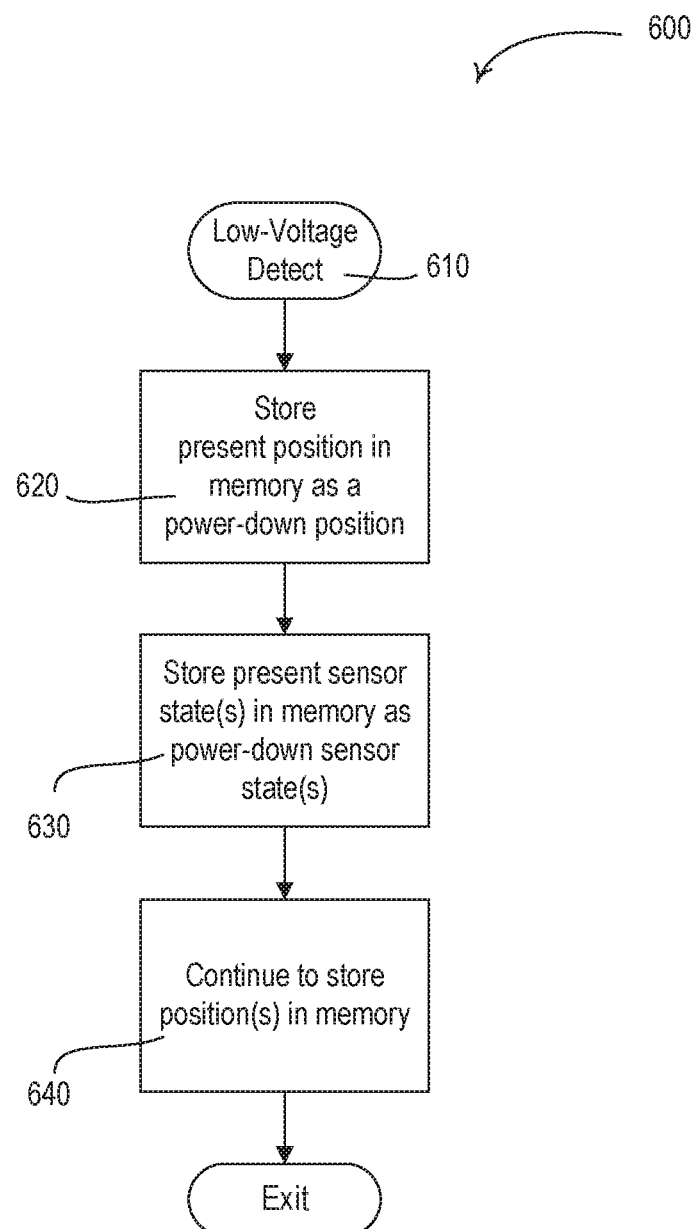
FIGS. 6-8 are flowcharts of example procedures that may be executed by a control circuit of a motor drive unit of a motorized window treatment.

FIG. 6 is a flowchart of an example power-down procedure 600 that may be executed upon detection of a power loss event. For example, the power-down procedure 600 may be executed by a control circuit of a motor drive unit (e.g., the control circuit 240 of the motor drive unit 200 of FIG. 2) that implements a sensor system (e.g., the sensor system 300 of FIGS. 3A and 3B) for controlling movements of a covering material (e.g., the shade fabric 112), and stores the positions of the covering material in a position table (e.g., the position table 400 of FIG. 4). At 610, a low-voltage condition may be detected. For example, the low-voltage condition may be detected when the magnitude of a supply voltage and/or a bus voltage drops below a predetermined low-voltage threshold $V_{TH}$, as described in detail above with respect to the example systems. For example, the low-voltage threshold $V_{TH}$ may be a fixed value or a percentage of the supply voltage and/or the bus voltage during normal operation, as described in detail above with respect to the example systems.

At 620, a present position may be stored in a memory as a power-down position upon detection of the low-voltage condition. For instance, referring back to FIGS. 5A and 5B, the control circuit 240 may store in the memory 260 the present position of the shade fabric 112 at time $t_2$ as the power-down position $P_d$. At 630, one or more present sensor states may be stored in the memory as one or more power-down sensor states. For example, referring back to FIGS. 5A and 5B, the control circuit 240 may store to the memory 260 the sensor states generated by the sensor circuit 250 at time $t_2$ as the power-down sensor states $S_{s1d}$, $S_{s2d}$.

After detection of the power loss event (e.g., the low-voltage condition), one or more positions may be continued to be stored in the memory at 640. For example, referring back to FIG. 5B, if the motor is rotating, the control circuit 240 may continue to update the present position of the shade fabric 112 in the memory 260 until time $t_3$, when the control circuit may become unpowered. Prior to time $t_3$, a final position $P_f$ may have been stored in the memory (e.g., by a different software procedure than the power-down procedure 600).

Figure 7:
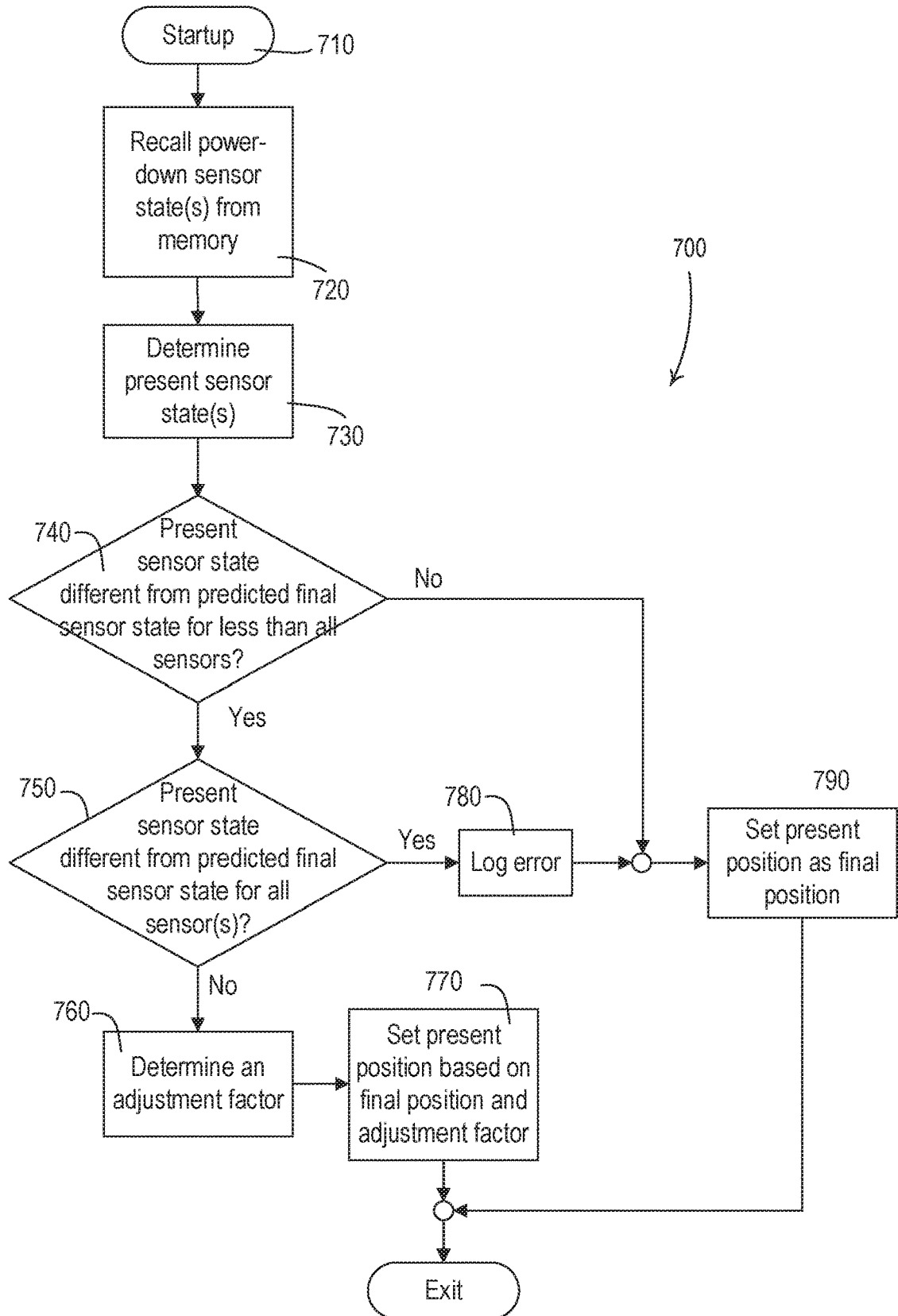

FIG. 7 is a flowchart of an example power-up procedure 700, for example, that may be executed as part of a startup routine. For example, the power-up procedure 700 may be executed by a control circuit of a motor drive unit (e.g., the control circuit 240 of the motor drive unit 200 of FIG. 2) that implements a sensor system (e.g., the sensor system 300 of FIGS. 3A and 3B) for controlling movements of a covering material (e.g., the shade fabric 112), and stores the positions of the covering material in a position table (e.g., the position table 400 of FIG. 4). At 710, the motor drive unit may be powered up and the control circuit may execute the power-up procedure 700. For example, when the motor drive unit 200 is powered up again after a power loss event, the control circuit 240 may once again receive sensor signals from sensors 320, 330, and determine power-ups sensor state, such as the power-up sensor states $S_{s1u}$, $S_{s2u}$. However, because of the power loss event, the control circuit may need to adjust for certain inaccuracies, and may do so as part of the power-up procedure 700.

At 720, the power-down position and the one or more power-down sensor states may be recalled from the memory. For example, referring back to FIG. 5A, these may be the power-down position $P_d$ and the power-down sensor states $S_{s1d}$, $S_{s2d}$ that the control circuit 240 stored in the memory 260 at time $t_2$. At 730, one or more present sensor states may be determined. The one or more power-up sensor states are compared with the power-down sensor states to determine whether further adjustments are needed. At 740, a determination may be made as to whether the power-up sensor state is different from the power-down sensor state for one or more sensors or not.

If the power-up sensor state is different from the power-down sensor state for one or more sensors, a determination may be made as to whether the present sensor state is different from the power-down sensor state for all the sensors or not at 750. If that is not the case, an adjustment factor may be determined at 760. For example, the adjustment factor may be determined based on the power-down sensor state and the power-up sensor state for the one or more sensors, as described in detail above with respect to the example systems. For example, referring back to FIG. 5A, based on the difference between the power-down sensor states $S_{s1d}$, $S_{s2d}$ and the power-up sensor states $S_{s1u}$, $S_{s2u}$, the control circuit 240 may determine that the power-up sensor states $S_{s1u}$, $S_{s2u}$ are 1 sensor edge behind power-down sensor states $S_{s1d}$, $S_{s2d}$, and set the adjustment factor as −1. At 770, a present position may be set based on the power-down position and the adjustment factor. For instance, continuing from the previous example, if the power-down position $P_d$ stored in the position table 400 was 8541, the control circuit 240 may set the present position at power-up $P_u$ to be 8540 (e.g., 8541−1).

If it is determined at 750 that the power-down sensor state is different from the present sensor state for all the sensors, an error may be logged at 780 (e.g., since the control circuit may be able to determine whether power-up present sensor states are behind or ahead of the power-down sensor states). Thus, the present position may be set as the power-down position at 790. If it is determined at 740 that the power-down sensor state is not different from the power-up sensor state for any of the sensors, the present position may be set as the power-down position at 790. In such cases, because all the power-down sensor states are equal to the power-up sensor states, it may be concluded that the power-down position was determined based on accurately detected power-down sensor states.

Figure 8:
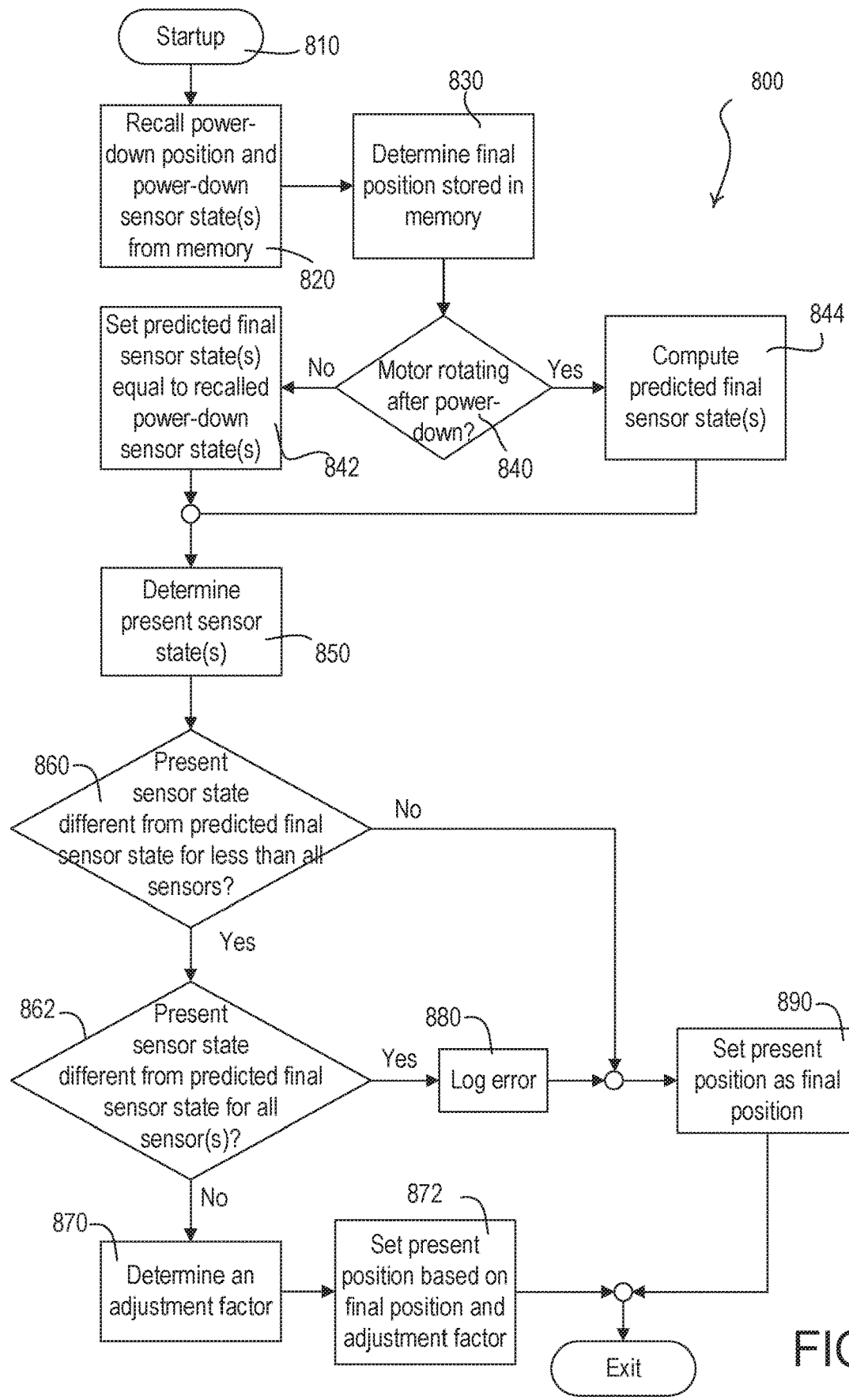

FIG. 8 is a flowchart of an example power-up procedure 800, for example, that may be executed as part of a startup routine. For example, the power-up procedure 800 may be executed by a control circuit of a motor drive unit (e.g., the control circuit 240 of the motor drive unit 200 of FIG. 2) that implements a sensor system (e.g., the sensor system 300 of FIGS. 3A and 3B) for controlling movements of a covering material (e.g., the shade fabric 112), and stores the positions of the covering material in a position table (e.g., the position table 400 of FIG. 4). At 810, the motor drive unit may be powered up and the control circuit may execute the power-up procedure 700. For instance, when the motor drive unit 200 is powered up again after a power loss event, the control circuit 240 may once again receive sensor signals from sensors 320, 330, such as power-up sensor states $S_{s1u}$, $S_{s2u}$. However, because of the power loss event, the control circuit may need to adjust for certain inaccuracies, and may do so by as part of the power-up procedure 800.

At 820, the power-down position and the one or more power-down sensor states may be recalled from the memory. For instance, referring back to FIG. 5B, these may be the power-down position $P_d$ and the power-down sensor states $S_{s1d}$, $S_{s2d}$ that the control circuit 240 stored in the memory 260 (e.g., at time $t_2$ of FIGS. 5A and 5B). At 830, a final position may be determined from the memory. For instance, as described in detail above with respect to the example systems, the control circuit 240 may look up the final position $P_f$ recorded in position table 400.

At 840, a determination may be made as to whether the motor was stopped or rotating during the power loss event (e.g., after the power-down position was stored). For example, whether the motor was running may be determined based on whether the final position is equal to the power-down position, as described in detail above with respect to the example systems. For example, referring back to FIG. 5B, if the control circuit 240 determines that the final position $P_f$ is equal to the power-down position $P_d$, the control circuit 240 may conclude that the motor 210 was not moving at time $t_2$. Otherwise, the control circuit may conclude that the motor 210 was rotating after time $t_2$.

If the control circuit determines that the motor was stopped before the power loss event (e.g., and did not rotate after the power-down position was stored), one or more predicated final sensor states may be set to be the power-down sensor states at 842. For instance, referring back to FIG. 5B, based on the determination that the motor 210 was stopped (e.g., at time $t_2$ of FIG. 5A), the control circuit 240 may predict that the final sensor states $S_{s1f}$, $S_{s2f}$ are the same as the power down sensor states $S_{s1d}$, $S_{s2d}$.

If the control circuit determines that the motor was rotating during the power loss event (e.g., after the power-down position was stored), one or more predicted final sensor states may be computed as described in detail above with respect to the example systems at 844. For example, the one or more predicted final sensor states may be computed based on a number of sensor edges between the power-down position $P_d$ and the final position $P_f$, and a direction of rotation before the power loss event.

With the predicted final sensor states set or computed, one or more present sensor states may be determined at 850. The one or more present sensor states may be compared with the predicted final sensor states to determine whether further adjustments are needed. Thus, a determination is made as to whether the present sensor state is different from the predicted final sensor state for one or more sensors or not at 860.

If the present sensor state is different from the predicted final sensor state for one or more sensors, the control circuit may further determine whether the predicted final sensor state is different from the present sensor state for all the sensors at 862. If that is not the case, an adjustment factor is determined at 870. For example, the adjustment factor may be determined based on the predicted final sensor state and the present sensor state for the one or more sensors, as described in detail above with respect to the example systems. For instance, referring back to FIG. 5B, based on the generated sensor states between $t_2$ and $t_3$, the control circuit 240 may determine that the power-up sensor states $S_{s1u}$, $S_{s2u}$ are 1 sensor edge ahead of final sensor states $S_{s1f}$, $S_{s2f}$, and set the adjustment factor as +1. At 872, a present position is set based on the final position and the adjustment factor. For example, continuing from the previous example, if the final position $P_f$ stored in the position table 400 was 8541, the control circuit may set the present position at power-up $P_u$ to be 8542 (e.g., 8541+1).

If the control circuit determines that the predicted final sensor state is different from the present sensor state for all the sensors, an error may be logged at 880. This is because in such cases, it may not be possible to determine whether the present sensor states at power-up are behind or ahead of the final sensor states. At 890, a present position may be set as the final position.

On the other hand, if the control circuit determines at 860 that the predicted final sensor state is not different from the present sensor state for any of the sensors, a present position may be set as the final position at 890. In such cases, because the predicted final sensor states are equal to the present sensor states at power-up, it may be concluded that the motor was stopped during the power loss event (e.g., after the final position was recorded) and the final position was determined based on accurately detected sensor states.

Unless otherwise stated, the foregoing alternative examples are not mutually exclusive, but may be implemented in various combinations to achieve unique advantages. As these and other variations and combinations of the features discussed above may be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings may identify the same or similar elements.

The invention claimed is:

1. A motorized window treatment system comprising:
a covering material;
a sensor circuit configured to generate one or more sensor signals indicative of a position of the covering material; and
a control circuit configured to be powered from a supply voltage and to control a motor drive circuit, the control circuit configured to determine a present sensor state of the sensor circuit in response to the sensor signal and update a present position of the covering material in response to changes in the present sensor state of the sensor circuit;
wherein, when powering up, the control circuit configured to:
determine a power-up sensor state based on the present sensor state of the sensor circuit;
determine a predicted sensor state for the sensor circuit based at least in part on a power-down position recorded at a first time and a final position recorded at a second time;
compare the predicted sensor state with the power-up sensor state; and
update the present position of the covering material based on the comparison of the predicted sensor state and the power-up sensor state.

2. The motorized window treatment system of claim 1, wherein, prior to determining the power-up sensor state, the control circuit is configured to:
detect a power-loss event based on a voltage falling below a predetermined low-voltage threshold;
store the present position as the power-down position based on detection of the power-loss event; and
store the present sensor state as a power-down state based on detection of the power-loss event,
wherein the predetermined low-voltage threshold is below at least one of a bus voltage and a supply voltage and is above a voltage at which the control circuit is unpowered.

3. The motorized window treatment system of claim 2, wherein the supply voltage powers the control circuit.

4. The motorized window treatment system of claim 2, further comprising a motor drive circuit configured to generate signals that cause a motor to change the position of the covering material, wherein the motor drive circuit is configured to receive the bus voltage for driving the motor.

5. The motorized window treatment system of claim 2, wherein the control circuit is configured to determine the final position of the covering material prior to an end of the power-loss event.

6. The motorized window treatment system of claim 5, wherein the control circuit is configured to update the present position of the covering material by setting the present position of the covering material equal to the final position and adjusting the present position of the covering material by an adjustment factor if the predicted sensor state is not the same as the power-up sensor state.

7. The motorized window treatment system of claim 6, wherein the control circuit is configured to determine the adjustment factor by calculating the predicted sensor state based on a difference between the final position of the covering material and the power-down position and comparing the predicted sensor state and the power-up sensor state.

8. The motorized window treatment system of claim 6, wherein the control circuit is configured to adjust the present position of the covering material by the adjustment factor by incrementing or decrementing the present position of the covering material depending upon a direction of rotation of a motor prior to the power-loss event.

9. The motorized window treatment system of claim 5, wherein the control circuit is configured to adjust the present position of the covering material by setting the present position of the covering material equal to the final position if the predicted sensor state is the same as the power-up sensor state.

10. The motorized window treatment system of claim 5, wherein the control circuit is configured to determine a predicted sensor state by setting the predicted sensor state equal to the power-down state if the final position of the covering material is equal to the power-down position.

11. The motorized window treatment system of claim 5, wherein the control circuit is configured to determine the predicted sensor state by determining the predicted sensor state based on the power-down state and a difference between the final position of the covering material and the power-down position.

12. The motorized window treatment system of claim 1, wherein the control circuit is configured to store an error condition in memory if the predicted sensor state is not the same as the power-up sensor state for multiple sensor signals generated by the sensor circuit.

13. A method of adjusting a present position of a covering material of a motorized window treatment, the method comprising:
    determining a power-up sensor state based on a present sensor state of a sensor circuit;
    determining a predicted sensor state for the sensor circuit based at least in part on a power-down position recorded at a first time and a final position recorded at a second time;
    comparing the predicted sensor state with the power-up sensor state; and
    determining a present position of the covering material based on the comparison of the predicted sensor state and the power-up sensor state.

14. The method of claim 13, further comprising, prior to determining the power-up sensor state:
    detecting a power-loss event based on a voltage falling below a predetermined low-voltage threshold;
    storing the present position as a power-down position based on detection of the power-loss event; and
    storing the present sensor state as a power-down state based on detection of the power-loss event,
    wherein the predetermined low-voltage threshold is below at least one of a bus voltage and a supply voltage and is above a voltage at which a control circuit is unpowered.

15. The method of claim 14, further comprising:
    determining a final position of the covering material prior to an end of the power-loss event.

16. The method of claim 15, wherein determining the present position of the covering material further comprises:
    setting the present position of the covering material equal to the final position; and
    adjusting the present position of the covering material by an adjustment factor if the predicted sensor state is not the same as the power-up sensor state.

17. The method of claim 16, further comprising:
    determining the adjustment factor by calculating the predicted sensor state based on a difference between the final position of the covering material and the power-down position and comparing the predicted sensor state and the power-up sensor state.

18. The method of claim 17, wherein adjusting the present position of the covering material by the adjustment factor further comprises incrementing or decrementing the present position of the covering material depending upon a direction of rotation of a motor prior to the power-loss event.

19. The method of claim 15, wherein determining the present position of the covering material further comprises setting the present position of the covering material equal to the final position if the predicted sensor state is the same as the power-up sensor state.

20. The method of claim 15, wherein determining the predicted sensor state further comprises setting the predicted sensor state equal to the power-down state if the final position of the covering material is equal to the power-down position.

21. The method of claim 15, wherein determining the predicted sensor state further comprises determining the predicted sensor state based on the power-down state and a difference between the final position of the covering material and the power-down position.

22. The method of claim 13, further comprising:
    storing an error condition in memory if the predicted sensor state is not the same as the power-up sensor state for multiple sensor signals generated by the sensor circuit.

23. The method of claim 14, wherein the supply voltage powers the control circuit, and wherein a motor drive circuit is configured to receive the bus voltage for driving a motor.

* * * * *